June 13, 1950
C. LUZ
2,511,355
DEVICE FOR REPLACING A CAMERA HOUSING
BY A FOCUSING SCREEN HOUSING
Filed April 19, 1949
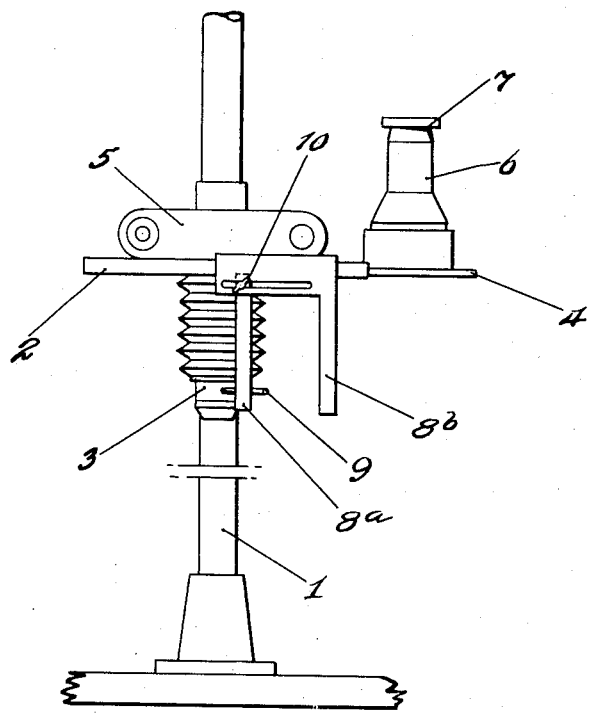
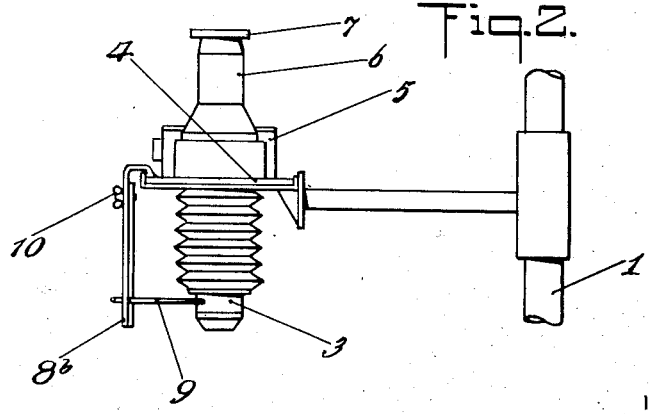
INVENTOR
CHRISTIAN LUZ
BY Fred A. Klein
ATTORNEY Patented June 13, 1950

2,511,355

UNITED STATES PATENT OFFICE 2,511,355

DEVICE FOR REPLACING A CAMERA HOUSING BY A FOCUSING SCREEN HOUSING

Christian Luz, Wetzlar, Germany, assignor to Ernst Leitz, G. m. b. H., Wetzlar, Germany, a corporation of Germany Application April 19, 1949, Serial No. 88,289
In Germany October 1, 1948

2 Claims. (Cl. 95—44)

1

The present invention relates to photographic apparatus.

Photographic devices are known in which the exchangeable objective of a roll film camera is fastened to the lower side of a carrier plate, and in which the camera housing may be replaced by a focusing screen housing having an eyepiece behind the objective. In such devices the focusing of the objective is obtained by observing the image upon the focusing screen, the objective normally being kept wide open during the focusing. When the picture is actually taken, the diaphragm of the objective must then be adjusted to the most favorable value with respect to both sharpness of the subject and the prevailing light conditions. If several successive exposures are made with a photographic device of this type, it may easily happen that, after an exposure, the readjustment of the diaphragm for focusing is forgotten, with the result that defective pictures are obtained.

In order to obviate this disadvantage, there is provided in accordance with the present invention, mechanical means adapted to automatically adjust the objective diaphragm when the camera housing is replaced by the focusing screen housing. If the camera housing and the focusing screen housing are arranged upon a sliding mechanism, it is possible to connect an adjusting lever in a simple manner with the objective diaphragm; this lever may be actuated by suitable means such as for example the prongs of a fork which are rigidly connected to the slide. At least one prong of said fork may be made adjustable with respect to the various diaphragm openings.

In the accompanying drawings which form a part of this description and which illustrate one embodiment of the invention, Fig. 1 is a front elevational view of an apparatus embodying the adjusting mechanism in accordance with this invention; and Fig. 2 is a side elevation of Fig. 1.

Referring now to the drawing, the column 1 carries a plate 2 to which is fastened the objective 3 and upon which there may be displaced a slide 4 which latter forms a support for the camera housing 5 and the focusing screen housing 6 and lens 7. To the slide 4 there are rigidly fastened, in any suitable manner, the two prongs 8a and 8b of a fork, as shown. The adjusting lever 9 for the diaphragm of the objective 3 is mounted for engagement by one or the other of the prongs

2

8a or 8b when the slide 4 is moved either to the right or to the left. As shown in the drawing, the device is in a position suitable for making an exposure. If it is desired to change the position of prong 8a with respect to the position of prong 8b, this can be readily effected by loosening the wing screw nut 10 and sliding the adjustable arm 8a in any desired direction.

While I have described above the principles of my invention in connection with specific apparatus, it is to be clearly understood that this description is made only by way of example and not as a limitation upon the scope of my invention.

What is claimed is:

1. In combination in a photographic apparatus, means for replacing a camera housing with a focusing screen housing while using one and the same objective, means for effecting the focusing of the objective with a larger aperture opening than is required for picture exposure, and means for automatically adjusting the aperture opening of the objective during the replacement of the camera housing by the focusing screen housing, said means for replacing the camera housing with the focusing screen housing comprising a slide supporting said two housings, said slide being horizontally displaceable on the mounting plate of the objective behind said fixed objective, and in which said adjusting means comprises a fork rigidly attached to the slide and an objective opening adjusting lever, the prongs of the said fork being mounted for engagement with said adjusting lever when said slide is moved horizontally.

2. Device according to claim 1 in which the position of at least one of said prongs is adjustable in respect to said lever.

CHRISTIAN LUZ.

REFERENCES CITED

The following references are of record in the file of this patent:

UNITED STATES PATENTS

| Number | Name | Date |
|---|---|---|
| 571,806 | Stern | Nov. 24, 1896 |
| 1,791,112 | Azarraga | Feb. 3, 1931 |
| 1,996,481 | Morgan | Apr. 2, 1935 |
| 2,397,742 | Kals | Apr. 2, 1946 |
| 2,424,176 | Kals | July 15, 1947 |